United States Patent [19]

Smith, III

[11] Patent Number: 5,099,882

[45] Date of Patent: Mar. 31, 1992

[54] PRESSURE BALANCED HYDRAULIC COUPLING WITH METAL SEALS

[75] Inventor: Robert E. Smith, III, Stafford, Tex.

[73] Assignee: National Coupling Company, Inc., Stafford, Tex.

[21] Appl. No.: 640,063

[22] Filed: Jan. 11, 1991

[51] Int. Cl.⁵ ............................................. F16L 37/28
[52] U.S. Cl. ................................. 137/614.04; 137/614; 251/282; 285/106; 285/900
[58] Field of Search .................. 285/95, 106, 900; 137/614, 614.04; 251/281, 282; 277/27, 205

[56] References Cited

U.S. PATENT DOCUMENTS

| | | | |
|---|---|---|---|
| 4,709,726 | 12/1987 | Fitzgibbons | 137/614.04 |
| 4,754,780 | 7/1988 | Smith, III | 137/614.04 |
| 4,813,454 | 3/1989 | Smith, III | 137/614.04 |
| 4,858,648 | 8/1989 | Smith, III et al. | 137/614.04 |
| 5,015,016 | 5/1991 | Smith, III | 137/614.04 |

FOREIGN PATENT DOCUMENTS 2225314 12/1972 Fed. Rep. of Germany ....................... 137/614.04

Primary Examiner—A. Michael Chambers
Attorney, Agent, or Firm—Arnold, White & Durkee

[57] ABSTRACT

A pressure-balanced hydraulic coupling for use in undersea drilling and production operations, the coupling having radial passageways communicating between the male and female members such that substantial fluid pressure is not exerted against the face of either member during coupling or uncoupling or during the coupled state. Check valves in both the male and female members are opened when the male member probe is fully inserted into the receiving chamber of the female member. Mutually opposed valve actuators contact one another to effectuate the simultaneous opening of each check valve, and allow fluid to flow through a valve port and then radially through matching fluid passageways in the male and female members. The radial passageways of the male and female members match up at their longitudinal surfaces so that fluid pressure between the male and female members is in a substantially radial direction and is not exerted at the face of either member. A first pair of seals is positioned on each side of the radial passage for sealing between the receiving chamber and the seal retainer. A second pair of seals is positioned on each side of the radial passage for sealing between the seal retainer and the male member. The seals are pressure-energized metal seals.

50 Claims, 4 Drawing Sheets

PRESSURE BALANCED HYDRAULIC COUPLING WITH METAL SEALS

BACKGROUND OF THE INVENTION

1. Field of the Invention

This invention relates, in general, to hydraulic couplings, and specifically to hydraulic couplings used in undersea drilling and production applications. More particularly, the invention involves a pressure balanced hydraulic coupling wherein radial passages are positioned to allow connection or disconnection of the coupling without substantial fluid pressure exerted axially against the face of the male member.

2. Description of the Related Art

Subsea hydraulic couplings are old in the art. The couplings generally consist of a male and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

Problems arise with the use of hydraulic couplings in relatively high pressure systems due to the high axial forces imposed on the male and female members during the coupling operation and during their use. In such couplings, it is necessary for the fluid force opposing the face of the male or female member to be overcome before the fluid communication is established between the members. In a relatively high pressure system, high forces imposed on the valve members may render the connection of the male member very difficult. Also, during use, fluid pressure is exerted between the male and female members in such as way as to tend to separate them. The force necessary to join the members and the resultant tendency of the body members to separate are characteristic problems in the prior art. High pressure systems and undersea applications also experience problems associated with sealing the junction between the male and female members.

Ideally, hydraulic couplings should, as far as possible, be pressure balanced, so that fluid pressure does not hinder connection or urge separation of the male and female members. Preferably, to prevent loss of fluid in coupling or uncoupling, the members should include valve means to open automatically on coupling and close automatically on uncoupling. Ideally, the coupling also should prevent the implosion of the seals due to a vacuum when the coupling members are separated. Finally, the coupling should employ seals which can withstand high pressures as well as the corrosive effects of undersea or other adverse environments. The present invention solves all of these needs and requirements.

In Robert E. Smith III U.S. Pat. No. 4,754,780, a pressure-balanced hydraulic coupling is disclosed, wherein fluid communication between the male and female coupling members is through radial fluid passages in the members. In Robert E. Smith III U.S. Pat. No. 4,694,859, an undersea hydraulic coupling and metal seal is shown. The metal seal is ring-shaped and is pressure energized to seal radially between the female member and the outer surface of the male member. In Robert E. Smith III U.S. Pat. No. 4,832,080, a pressure-balanced hydraulic coupling with metal seals is disclosed. Like the coupling in U.S. Pat. No. 4,754,470, the fluid communication is through radial fluid passages in the male and female members. Two metal seals are positioned between the circumference of the male member and the central bore of the female member, such that the radial fluid passages are between the seals. The U.S. Pat. Nos. 4,754,780, 4,694,859 and 4,832,080 are incorporated herein by reference.

SUMMARY OF THE INVENTION

The present invention resides in a hydraulic coupling of the foregoing type, including male and female members for fluid communication therebetween such that fluid passages are mutually positioned to allow connection or disconnection of the coupling without substantial fluid pressure exerted axially against the face of the male member. The fluid passages also are mutually positioned so as to substantially prevent separation forces between the male and female members when the passages are pressurized by fluid. Metal seals are employed in the male member and the female member.

The fluid communication between the male and female members in the present invention preferably is established between a radial passageway at the outer longitudinal surface of the male member and a matching radial passageway in the side wall of the receiving chamber of the female member. When the male member is fully inserted into the receiving chamber of the female member, fluid communication between the two members is established through the matched radial passageways. The leading faces of mutually opposed valve actuators in the two members come into contact with one another, and thereby urge check valves in the respective members into the open position. When in the open position, fluid may flow through valve ports defined by the open check valves and through the radial passageway inboard of the valve seats.

One or more radial metal seals are positioned to form a fluidtight seal between the male member and the seal retainer. One or more radial metal seals also are positioned between the seal retainer and the central bore or receiving chamber of the female member. The seal retainer also may be configured to include one or more dovetail elastomeric seals, with the dovetail fit preventing implosion of the elastomeric seal into the central bore or receiving chamber.

The male member and female member each may include a check valve and a radial metal seal to form a fluid-tight seal between the valve actuator and the central bore of the female member. An elastomeric dovetail seal also may be used to seal between the seal retainer and the valve actuator.

DETAILED DESCRIPTION OF THE PREFERRED EMBODIMENT

Figure 1:
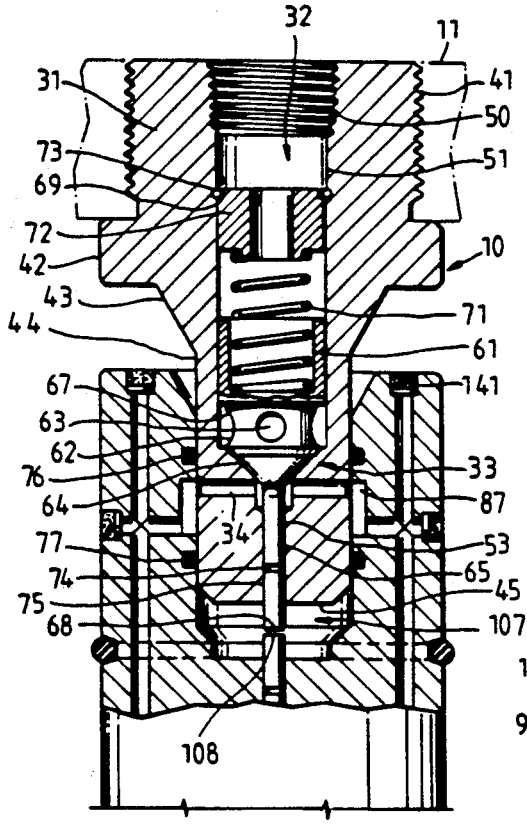
FIG. 1 is a section view of the male member partially inserted into the female member of a coupling according to previously issued U.S. Pat. No. 4,754,780.
Figure 2:
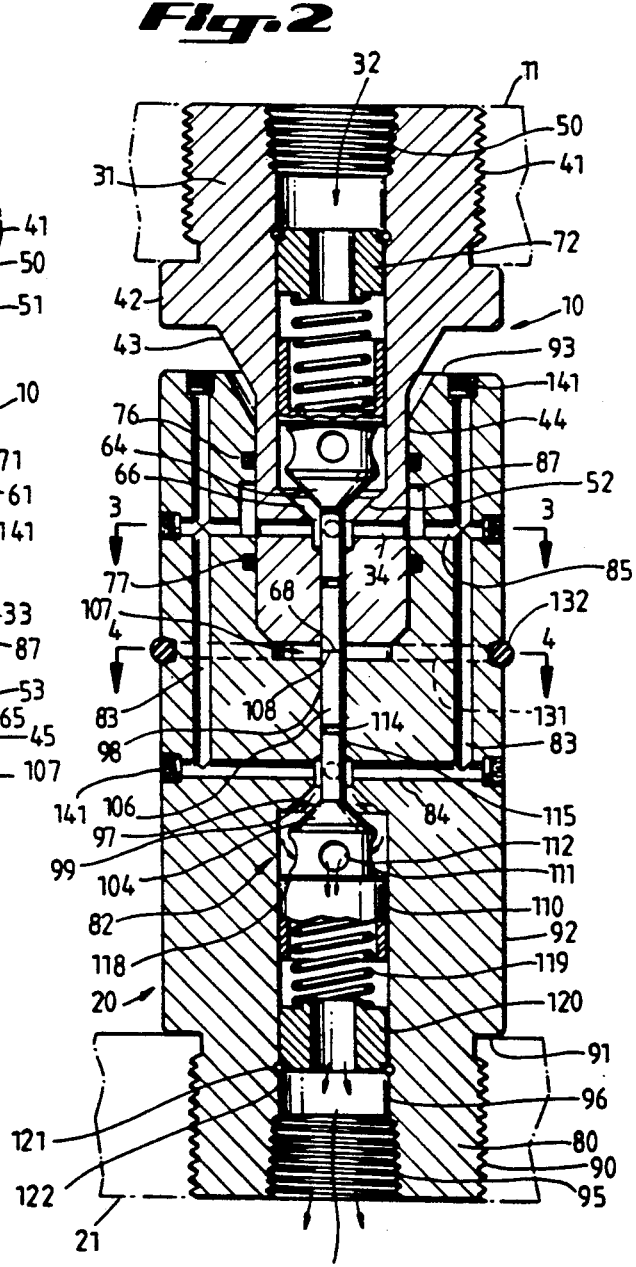
FIG. 2 is a section view of the male member fully inserted into the female member of a coupling according to U.S. Pat. No. 4,754,780.
Figure 3:
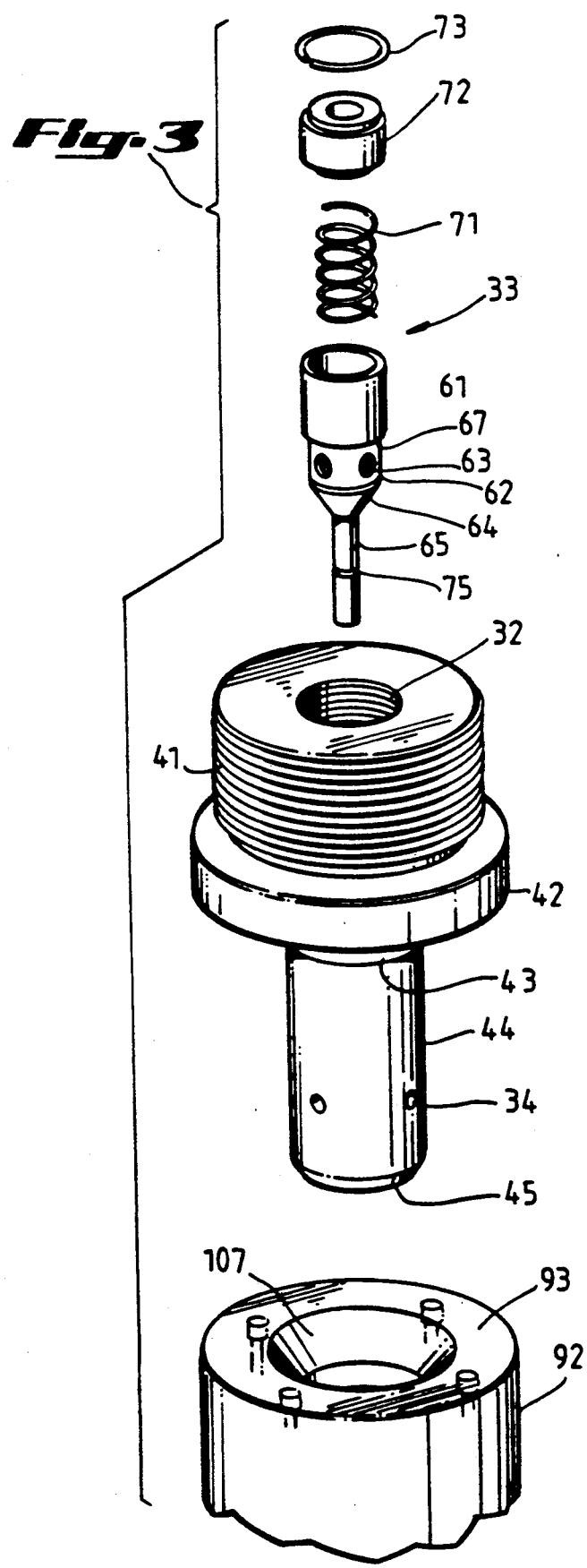
FIG. 3 is an exploded perspective view of the male member of a coupling according to U.S. Pat. No. 4,754,780.

In FIG. 1, FIG. 2 and FIG. 3, the coupling J.S. Pat. No. 4,754,780 is shown. The coupling according to the present invention has the same general structure as the coupling of U.S. Pat. No. 4,754,780, with the exception of the features described below with reference to FIGS. 4, 5 and 6.

The coupling of FIG. 1 comprises a male member 10, a female member 20 and fluid passageways establishing fluid communication between the male member and female member when the male member is inserted into the female member. The fluid communication is established without significant pressure exerted against the face of the male member during or after insertion. The fluid communication between the male member and female member is established radially via a passageway in the outside longitudinal surface of the male member to a corresponding radial fluid passageway in the receiving chamber of the female member.

In FIG. 1 and FIG. 2, the male member 10 comprises a body 31, a central bore 32, a valve assembly 33, and a radial passage 34. The body 31 of the male member first comprises a handle 41 which optionally is threaded or otherwise connected to a manifold plate 11. The male member and female member 20 are generally connected to opposing plates of a manifold and are held together by bolts or hydraulic members attached to the plates of the manifolds. The male member is commonly attached to one plate 11, while the female member is attached to an opposing plate 21 so as to face the male member and align with it. The male and female members may be attached to the manifold plates using various means, such as set screws or threads. Techniques for attaching the members to such manifold plates are well known to those skilled in the art.

The male member 10 includes a handle 41 which terminates at flange 42 of male member and tapered shoulder 43. The shoulder 43 is tapered down to the first end of the cylindrical probe wall 44 which terminates at probe face 45. The cylindrical probe wall 44 is adapted for sliding engagement with the female member, as will be discussed below. The body 31 of the male member, which is cylindrical in shape, thus includes handle 41, flange 42, shoulder 43, probe wall 44, and probe face 45.

The body of the male member also is provided with a central bore 32. The bore 32 may have several variations in its diameter as it extends through the body of the male member 10. In a preferred embodiment, the first end of the central bore comprises an internally threaded section 50 for connection to a hydraulic line. Adjacent and inboard of the threaded section is a cylindrical passageway 51 extending longitudinally within the male member body and terminating at valve seat 52 which is an inclined shoulder. Adjacent to the valve seat is cylindrical passage 53 having a reduced diameter which comprises a receiving bore for the valve actuator 65. In FIG. 1, the valve actuator bore 53 is narrower than the cylindrical passageway 51 for receiving the valve actuator 65 slidably therethrough.

As shown in FIG. 1, the valve assembly 33 is slidably received within the central bore 32 of the male member. The various parts of the valve assembly of the male member also are shown in an exploded perspective view of the male member in FIG. 3. The valve assembly comprises a cylindrical hollow valve head 61 which has an outer diameter dimensioned to slide within the cylindrical bore 51 of the male member, and a hollow cylindrical body section 62 having an outer diameter somewhat less than the diameter of the valve head. The cylindrical body section 62 includes valve body apertures 63 for fluid flow from the hollowed portion of the valve to the exterior of the valve. The cylindrical body section 62 terminates at valve face 64 which is conical in shape and dimensioned to seat within the valve seat 52 at the end of the male member bore. Extending from the valve face 64 is a valve actuator 65 which is cylindrical in shape and extends along the longitudinal axis of the male member. The valve actuator 65 is located at the apex of the conical shape of the valve face and is slidably received within the valve actuator bore 53 of the male member, extending through the valve port 66.

Helical valve spring 71 is used to urge the valve face 64 into a closed position against the valve seat 52. The helical valve spring 71 is located within the cylindrical passageway 51 and anchored at hollow spring collar 72 which is held in place by collar clip 73 inserted within the spring collar bore 69 at the inner surface of the cylindrical passageway 51 of the male member 10 as shown in FIG. The opposite end of the helical valve spring 71 is in contact with the shoulder 67 between the hollow valve head 61 and the hollow cylindrical body section 62. The valve face 64 is urged into a closed position against the valve seat 52 due to the helical valve spring 71.

Also shown in FIG. annular valve actuator seal 74 surrounding the outer circumference of valve actuator 65 is secured within the valve actuator seal groove 75 to seal the valve actuator from fluid loss through the valve actuator bore 53.

When the valve face 64 is in a closed position against the valve seat 52 as shown in FIG. 1, the valve assembly 33 seals fluid off from flowing between the central bore 32 and the radial passages 34 of the male member. One or more radial passages 34 in the body of the male member extend outwardly between the downstream or inboard side of the valve seat 52 and the outer circumference of the probe wall 44 of the male member. Annular probe seals 76 and 77 are situated about the circumference of the female receiving chamber and are used to seal off fluid from escaping at the upstream or downstream side of the radial passageways 34 and 85 in the male and female members. The inboard probe seal 76 and outboard probe seal 77 thus help assure that fluid flow is directly and radially between the male member 10 and the female member 20. The probe seals 76 and 77 may be elastomer O-ring type seals, or equivalent, or may be metal seals which are pressure-energized to seal the annulus between the male and female. This metal seal alternative will be more fully described below.

As shown in FIG. 2, the valve assembly 33 of the male member 10 and the valve assembly 82 of the female member 20 are each urged into an open position when the valve actuator face 68 of the male member contacts the mutually opposed valve actuator face 108 of the female member. The valve port 66 in the male member 10 is defined between the valve face 64 and the valve seat 52 when the valve assembly 33 is in an open position. Fluid then may flow through the male member 10 via the central passageway 32, the valve body apertures 63, the valve port 66 and the radial passageways 34. Fluid flow is thus directed into the radial passageways 85 of the female member 20 between the inboard and outboard probe seals 76 and 77.

The female member 20 comprises a body 80, a central bore 81, a valve assembly 82, and a passageway having radial sections 84, 85 and a longitudinal section 83 for fluid flow therethrough. The body 80 of the female member includes handle 90 which is optionally threaded to the manifold plate 21. Female member body 80 also includes a shoulder 91 which is adjacent to the handle 90 and the main cylindrical body 92 which terminates at the female member face 93. The central bore 81 has several variations in its diameter, as it extends through the body 92 of the female member 20. At a first or outer end of the central bore 81 is a threaded internal passageway 95 for connection to a threaded hydraulic line. The threaded portion 95 of the central bore 81 terminates at cylindrical passageway 96 which slidably receives a valve assembly 82. Cylindrical passageway 96 terminates internally at valve seat 97 for seating the valve face 104. Inboard of the valve seat 97 is narrowed valve actuator bore 98 which slidably receives the valve actuator 106 of the valve assembly 82 of female member 20. Adjacent to the valve actuator bore 98 is a cylindrical receiving chamber 107 which slidably receives the probe of the male member 10. As shown in FIG. 2, when the face 68 of the valve actuator 65 of the male member 10 and the mutually opposed face 108 of the valve actuator 106 of the female member 20 are slidably engaged in contact with one another, the valve assemblies 33 and 82 are forced into open positions for fluid flow in the radial passageways between the male and female members.

The valve assembly 82 of the female member 20 is substantially similar to the valve assembly 33 of the male member 10 and comprises a hollow valve head 110 which is slidably received within the cylindrical passageway 96 of the female member 20. The female member valve assembly 82 further comprises hollow cylindrical body section 111 adjacent to the valve head 110. The cylindrical body section 111 has an outer diameter somewhat less than the outer diameter of the hollow valve head 110. The cylindrical body section includes valve body apertures 112 for fluid flow between the inside and outside of the cylindrical body section 111. Adjacent to the cylindrical body section 111 is a valve face 104 which is generally conical in shape for seating at the valve seat 97, and valve actuator 106 which is an elongated cylindrical section terminating in valve actuator face 108. The valve actuator 106 is located at the apex of the conical shape of the valve face 104 and extends through the valve port 90. The valve actuator 106 of the female member 20 further is provided with valve actuator seal 114 which is positioned in the annular valve actuator seal groove 115. The valve actuator seal 114 thus prevents fluid loss through the valve actuator bore 98.

To urge the female member valve assembly 82 into the closed position, a helical valve spring 119 is mounted between the shoulder 118 of the valve head 110 and spring collar 120 having collar clip 121 within clip groove 122. The valve assembly 82 of the female member 20 and valve assembly 33 of the male member 10 are generally identical in components and function. When each valve is in an open position wherein the mutually opposed faces 68 and 108 of the two valve actuators are in contact with each other as shown in FIG. 2, the helical valve spring bias is insufficient to keep the check valves in the closed position. The passageways for fluid communication between the male member and the female member thereby allow fluid flow without any significant pressure exerted o the leading face 45 of the male member 10.

The fluid passageways in the female member 20 comprise a first radial passageway 84 directed radially from the inboard end of the valve seat 97, a second radial passageway 85 positioned at the receiving chamber 107 of the female member 20, and a longitudinal passageway 83 connecting between the first and second radial passageways 84 and 85. When the male member 10 is fully inserted within the female member 20, the radial passageway 34 at the outer circumference of the probe wall 44 of the male member 10 matches the second radial passageway 85 of the female member 20 for fluid flow therebetween. An annular slot 87 cut about the circumference of the receiving chamber 107 of the female member 20 makes it possible to obtain fluid communication between the male and female members without precise alignment of the male member and the female member or exact rotational orientation of the male member with respect to the female member. The inboard and outboard probe seals 76 and 77 in the sides of the receiving chamber 107 of the female member 20 seal off fluid flow except between the respective radial passageways 34 and 85 of the male and female members. Fluid flow at the point of contact between the male and female members is perpendicular to the longitudinal axis of the male and female members where the radial passageway 34 of the male member 10 and second radial passageway 85 of the female member 20 communicate. Thus, there is no longitudinal force exerted by the fluid between the male and female members. Any number of fluid passageways 34 may be used depending on the fluid flow characteristics desired.

Preferably, when the male member is inserted into the female member, each radial passageway 34 of the male member 10 will match a separate second radial passageway 85 of the female member 20, so that the passageways 34 and 85 are mutually positioned to facilitate fluid communication between the members. However, the annular slot 87 permits rotation of the male member 10 relative to the female member 20 and axial movement of the male member 10 relative to the female member 20 while maintaining radial fluid communication therebetween.

Manufacture of the male and female members involves machining or drilling of the fluid passageways therethrough. Because the radial sections 84, 85 and longitudinal sections 83 of the fluid passageways are machined or drilled in the female member 20, the passageways extend through to the outer circumference of the female member and to the female member face 93, respectively. These extensions of the radial and longitudinal fluid passageways of the female member are sealed with plugs 141 to prevent loss of fluid. It will be understood that these passageway extensions and the corresponding plugs 141 are not essential to the inventive concept. If another manufacturing technique for producing the device, such as casting, is employed, the passageway extensions and plugs 141 would not be required and may not be present.

As shown in FIG. 2, the female member 20 further includes one or more vent passages 131 for expelling water from the receiving chamber 107 of the female member 20. Each vent passage 131 connects between the central receiving chamber 107 and the outer surface of the female member 20. An annular vent hole seal 132 in a vent seal groove 133 is used to allow fluid flow only outwardly from the receiving chamber 107 when the male member 10 is inserted into the female member 20 and fluid is urged out of the central receiving chamber 107.

Separation of the male and female members under water allows the entry of seawater into the receiving chamber 107 of the female member. Although this seawater is prevented from entry into hydraulic lines because of the valve assemblies 33 and 82, when the male member 10 begins to enter the receiving chamber 107, a hydraulic "lock" may develop within the chamber to prevent adequate entry of the male member 10. The vent passage 131 provides a means for the trapped seawater to be forced from the receiving chamber 107 upon entry of the male member 10. Further, should annular probe seal 77 or valve stem seals 74 and 114 develop a fluid leak, the resulting build-up of hydraulic fluid pressure within the receiving chamber 107 will be obviated by the vent passage 131. The fluid may escape through the vent passage and pressure will not build up to exert a separation force between the male and female members.

The coupling according to the present invention has the same general structure as the coupling of U.S. Pat. No. 4,754,780 described above, with the exception of the features described below and shown in FIGS. 4, 5 and 6.

Figure 4:
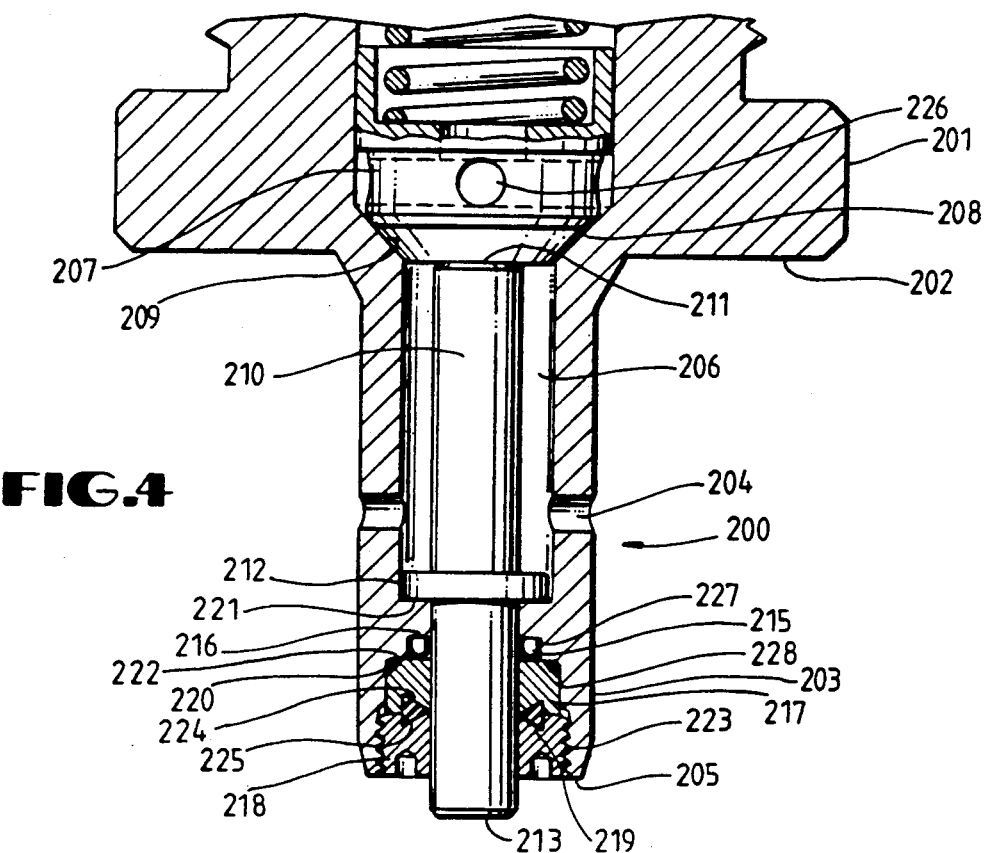
FIG. 4 is a section view of a portion of the male member according to a preferred embodiment of the present invention.

A section view of a portion of the male member according to a preferred embodiment of the present invention is shown in FIG. 4. The male member 200 comprises a male member body 201 having an outer shoulder 202 and a cylindrical probe wall 203 which terminates at probe face 205. The male member body 201 has a central bore 206 extending therethrough, with several variations along its length. One or more radial fluid passages 204 communicate between the central bore 206 and the outer surface of the cylindrical probe wall 203.

A poppet valve 207 is slidably inserted into the central bore 206 and is biased into a normally closed position where the valve face 208 is sealingly engaged with the valve seat 209 in the central bore. Also shown in FIG. 4 is a valve body aperture 226, through which the fluid moves when the poppet valve 207 is in the open position.

Figure 5:
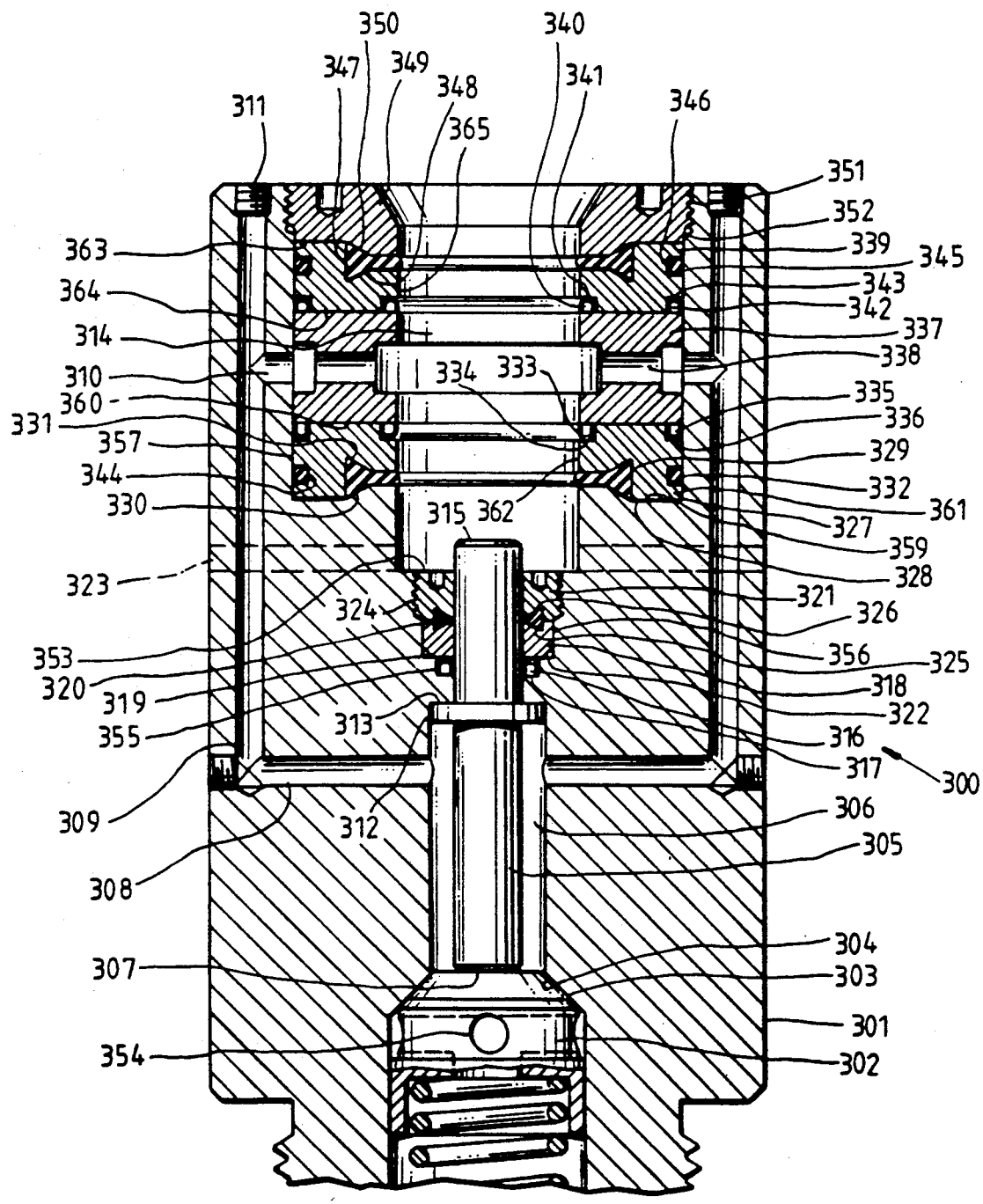
FIG. 5 is a section view of a portion of the female member according to a first preferred embodiment of the present invention.

The poppet valve actuator 210 is used to urge the poppet valve 207 open, when the poppet valve actuator 210 contacts the poppet valve actuator of the female member, shown in FIG. 5. The poppet valve actuator has a first end 211 and a second end 213 which contacts the poppet valve actuator of the female member. In a preferred embodiment, the poppet valve actuator 210 and the poppet valve 207 are separate components, however, it will be recognized that the poppet valve actuator may be integral with the poppet valve as shown in FIGS. 1, 2 and 3.

The poppet valve 207 is biased into the closed position by a spring, such as the helical spring shown in FIGS. 1, 2 and 3. In the closed position flange 212 of the poppet valve actuator 210 abuts the shoulder 221 in the central bore of the male member. When the poppet valve actuator 210 is urged against the poppet valve, fluid may flow through the central bore 206 of the male member, past the valve seat 209 and through the valve body apertures 226, and finally through the radial fluid passage 204. One or more radial fluid passageways 204 may be used.

To seal the poppet valve actuator with the wall 227 of the central bore of the male member when the poppet valve is in the open position, a radial metal seal 215 is positioned on shoulder 216 in the central bore. In a preferred embodiment, the seal is a pressure energized radial metal seal which expands radially against the poppet valve actuator and the wall 227 in the central bore of the male member, due to fluid pressure exerted on the cavity in the radial metal seal 215. However, other seal means may be used, such as an elastomeric seal, to seal between the poppet valve actuator 210 and the central bore 206 of the male member.

Also shown in FIG. 4, according to a preferred embodiment of the present invention, is a retainer 217 positioned in the central bore of the male member to hold the seal 215 on the shoulder 216. The retainer 217 is preferably a sleeve-like member, which may be threaded to the male member, or inserted and secured with a clip. The retainer 217 also may be configured to be engaged with the probe face 205 or the cylindrical probe wall 203. However, in the preferred embodiment shown in FIG. 4, retainer locking member 218 is threaded to the inner cylindrical surface 228 of the central bore of the male member. The threads 223 are on the inner cylindrical surface 228 of the central bore and the outer cylindrical surface of the retainer locking member 218.

As shown in FIG. 4, the male member also includes a seal 219, which sealingly engages the poppet valve actuator 210, and serves as a backup to the metal seal 215. The seal 219 preferably is an elastomeric seal, and preferably has a dovetail shape. The dovetail shape prevents the seal 219 from being sucked into the central bore of the male member if a vacuum develops. The surface 224 of retainer 217 and the surface 225 of the retainer locking member 218 have a dovetail interfit with the dovetail seal 219.

Also shown in FIG. 4 is a seal 220, which may be an elastomeric seal or O-ring, to seal between the retainer 217 and the inner surface 228 of central bore 206 of the male member. Also shown is a shoulder 222 for seal 220. The shoulder 222 serves to axially position the retainer 217 so that the retainer 217 contacts the radial metal seal 215 to preload the seal by slightly compressing the seal axially. The inner circumferential surface of the seal moves radially inwardly and the outer circumferential surface moves radially outwardly, prior to pressure energization.

FIG. 5 shows the female member according to a first preferred embodiment of the present invention. The female member 300 comprises a female member body 301 having a central bore 306 extending therethrough. The central bore 306 may have several variations through the female member. Both the male member and the female member may be connected to manifold plates (shown in FIGS. 1 and 2). A poppet valve (or check valve) 302 is positioned in the central bore of the female member, with its valve face 303 in a normally closed position against the valve seat 304. Bias means, such as a helical spring shown in FIG. 2, is used to urge the poppet valve 302 into the closed position where the valve face 303 contacts the valve seat 304.

Poppet valve actuator 305 is slidably inserted in the central bore of the female member. When the first end 315 of the poppet valve actuator contacts the opposing poppet valve actuator 210 of the male member, the second end 307 of the poppet valve actuator urges the poppet valve 302 into the open position. The male member 200 is inserted into the receiving chamber 314 of the female member, so that the mutually opposed poppet valve actuators 210 and 305 come into contact with each other. The poppet valve actuator may be integral with the poppet valve, or may be separate components as shown in FIG. 4 and FIG. 5.

When the poppet valve 302 is in the closed position, the poppet valve actuator flange 312 abuts the shoulder 313 in the central bore 306 of the female member. Between the shoulder 313 and the valve seat 304 is a first radial fluid passage 308 which communicates between the central bore 306 and longitudinal fluid passage 309. The longitudinal fluid passage 309 extends substantially parallel to the central bore of the female member, and communicates with second radial fluid passage 310. The second radial fluid passage extends to the receiving chamber 314 of the female member. When the poppet valve 302 is urged into the open position, fluid moves from the central bore 306, past the valve seat 304 and through the valve body apertures 354, to first radial fluid passage 308, longitudinal fluid passage 309, and second radial fluid passage 310.

As discussed previously, a plug 311 may be used to close the end of longitudinal fluid passage 309 because of the manner in which the coupling is manufactured.

To seal the poppet valve actuator 305 with the inner circumferential wall 355 in the central bore 306, a ring-shaped seal 316 is positioned on shoulder 317 in the central bore. In a preferred embodiment, the ring-shaped seal 316 is a radial metal seal with a cavity that responds to fluid pressure in the coupling by urging the radial metal seal to expand radially against the poppet valve actuator. However, it will be recognized that other seal means, including elastomeric seals and O-rings, may be used without departing from the present invention. A retainer 318 is inserted in the central bore to hold the seal 316 on the shoulder 317. The retainer may be threaded to the inner surface 356 in the central bore or may be secured to the central bore with a clip (not shown). In a preferred embodiment, retainer locking member 321 is used to secure the retainer, which is threaded to the central bore. The threads 324 are on the outer circumferential surface of the retainer locking member and the inner circumferential surface 356 of the central bore.

In the first preferred embodiment of the female member, a second seal 320 is used between the seal retainer 318 and the poppet valve actuator 305. The seal 320 is preferably an elastomeric seal with a dovetail shape, which will prevent the seal 320 from being sucked into the central bore 306 of the female member, due to vacuum or low internal pressure acting on seal 320 when the male member and female member are disconnected. The seal 320 has a dovetail interfit with the surface 325 of the retainer 318 and the surface 326 of the retainer locking member 321.

Also shown in FIG. 5 is a seal 319, which may be an elastomeric seal or an O-ring, and is positioned on the shoulder 322 in the central bore of the female member. The shoulder 322 also serves to axially position the retainer 318 so that seal 316 may be preloaded by axial compression. This axial compression will urge the seal 316 to expand radially to seal against the wall 356 of the central bore 306 and the poppet valve actuator 305.

Also shown in FIG. 5 is an annulus or vent 323 which communicates between the receiving chamber 314 and the outer surface of the female member body. This vent passage 323 functions in the same manner as that described in the couplings shown in FIGS. 1 and 2.

Still referring to FIG. 5, seal retainer 327 is inserted into the receiving chamber 314 of the female member, adjacent to shoulder 328. The seal retainer 327 has a first end 360, a second end 359, an outer surface 361 and an inner surface 362. The seal retainer 327 is configured to position a pair of seals 333 and 335. In a preferred embodiment, seals 333 and 335 are radial metal seals, with cavities that may be pressure energized to urge the seal to expand radially in response to fluid pressure on the coupling. In a preferred embodiment, as shown in FIG. 5, seal 333 is positioned in seal groove 334 in the seal retainer 327. The seal 333 forms a fluid tight seal between the inner surface 362 of the second end 359 of seal retainer 327 and the cylindrical probe wall 203 of the male member when the male member is inserted into the receiving chamber 314. The seal 335 forms a seal between the outer surface 361 of the second end 359 of seal retainer 327 and the wall 357 of the receiving chamber 314. The seal 335 is positioned in seal groove 336 in the seal retainer 327.

Alternatively, the pair of seals may be positioned axially between the second end 359 of seal retainer 327 and the shoulder 328. However, in the embodiment shown in FIG. 5 the seals 333 and 335 are positioned axially between the first end 360 of seal retainer 327 and the retainer spacer 337. The retainer spacer 337 has a radial port (or passageway) 338 extending therethrough between the inner surface and outer surface. When the retainer spacer 337 is inserted into the receiving chamber 314, the radial port 338 and the second radial fluid passage 310 of the female member are mutually positioned so that fluid transmission may be accomplished therethrough. The retainer spacer may include a slot so that variations in the axial position of the retainer spacer will not prevent fluid communication between fluid passage 310 and fluid passage 338.

In the embodiment shown in FIG. 5, a seal 329 is positioned between the shoulder 328 and the second end 359 of seal retainer 327. In this embodiment, the seal 329 is an elastomeric seal with a dovetail shape. The surface 330 of the shoulder 328 and the surface 331 of retainer 327 have a dovetail interfit with the seal 329. Thus, the seal 329 will be prevented from implosion into the receiving chamber 314 when the male member is withdrawn from the receiving chamber. Alternatively, the seal 329 may be positioned between first end 360 of the seal retainer 327 and the retainer spacer 337. Still another alternative positions the seal 329 in a one-piece retainer, rather than a separate retainer 327 and retainer spacer 337. Also shown in FIG. 5 is a seal 332, which preferably is an elastomeric seal or O-ring, positioned between the outer surface 361 of retainer 327 and the wall of the receiving chamber 314.

In FIG. 5, seal retainer 339 is next inserted into the female member bore adjacent the retainer spacer 337. The retainer 339 has a first end 363, a second end 364, an inner surface 365 and an outer surface 366. A pair of seals 340 and 342 are positioned between the second end 364 of retainer 339 and the retainer spacer 337. It is preferred that the seals 340 and 342 be radial metal seals exposed to fluid pressure in the coupling so that the seals expand radially in response to fluid pressure. The seal 340 is positioned on groove 341 at inner surface 365 of the second end 364 of the retainer 339, while the seal 342 is positioned on groove 343 at outer surface 366 of the second end 364 of retainer 339. Alternatively, the seals 340 and 342 may be positioned between the first end 363 of retainer 339 and the retainer locking member 349. Seal 340 forms a seal between the seal retainer 339 and the male member, while seal 342 forms a seal between seal retainer 339 and the wall 357 of the receiving chamber.

As shown in FIG. 5, one set of seals 333 and 335 are at the inboard end of the female member receiving chamber from the radial fluid passage 338, while the second set of seals 340 and 342 are at the outboard end of the receiving chamber from the radial fluid passage 338. Although the specific arrangement of the seal retaining members may be varied in accordance with the present invention, each set of seals serves to seal the radial fluid passages between the male and female members.

In the embodiment shown in FIG. 5, seal 347 is positioned between the inner surface 365 of the first end 363 of retainer 339 and the retainer locking member 349. The seal 347 is preferably an elastomeric seal with a dovetail shape which forms a dovetail interfit with the surface 348 of the retainer 339 and the surface 350 of the retainer locking member 349. Thus, the seal 347 is prevented from implosion into the central bore. However, according to the present invention the seal may be omitted or it may be replaced with an elastomeric O-ring.

The retainer locking member 349 may be threaded to the female member as shown in FIG. 5, with threads 351 on the outer circumferential surface of the retainer locking member 349 and the inner circumferential surface 357 of the receiving chamber 314. Alternatively, the retainer locking member may be threaded or otherwise attached to the outer surface of the female member body, or may be replaced with a clip or other means for securing the seal retaining members in the receiving chamber 314. The retainer locking member 349 abuts shoulder 352 in the receiving chamber so that the extent of axial preloading of the metal seals is known.

A seal 345, which is preferably an elastomeric seal or O-ring, is positioned in groove 346 in seal retainer 339 to form a seal between the retainer 339 and the wall 357 of the receiving chamber 314. Similarly, elastomeric seal 332 is positioned in groove 344 in the seal retainer 327.

When the male member 200 is inserted into the receiving chamber 314 of the female member, the male member probe face 205 approaches the shoulder 353 in the receiving chamber. The poppet valve actuators 305 and 210 come into mutual contact to open the poppet valves. In that position, the radial passages 204 in the male member, the radial ports 338 in the retainer spacer, and the radial passages 310 in the female member are in alignment. In that position, when the valves are open, fluid communication may be established between the members without any pressure on the probe face 205 of the male member, or any pressure urging the members to separate.

Figure 6:
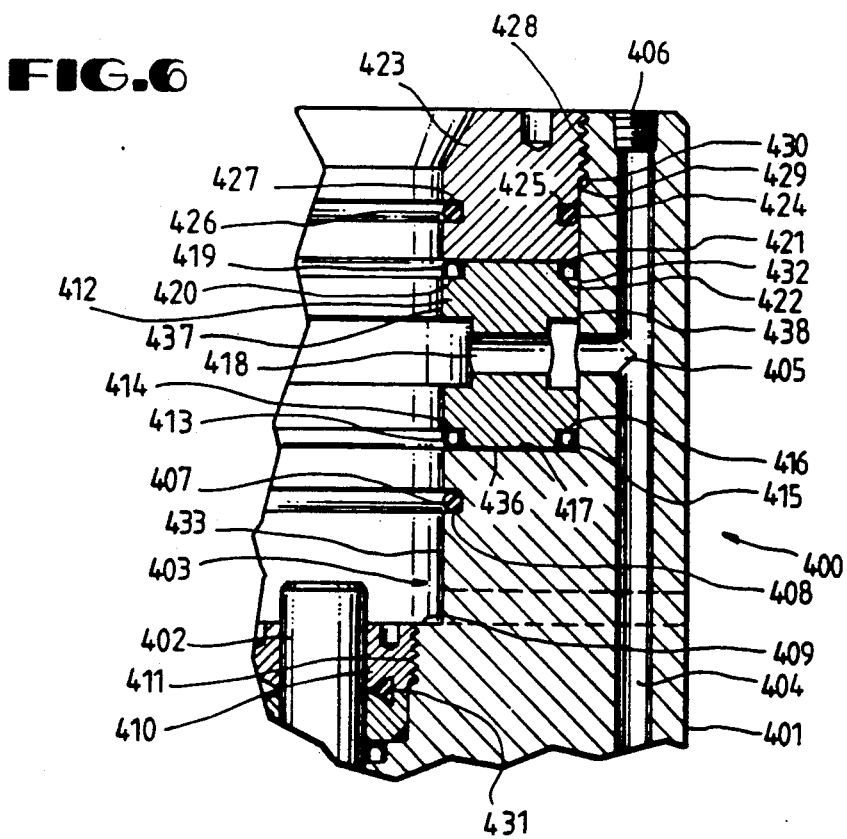
FIG. 6 is a section view of a portion of the female member according to a second preferred embodiment of the present invention.

In FIG. 6, a second embodiment of a portion of the female member according to the present invention is shown, showing only a quarter section view of the seals and seal retaining members in the female member. The female member 400 includes female member body 401, a poppet valve actuator 402, and receiving chamber 403. These components are not fully shown in FIG. 6, but are identical to those described in the embodiment of FIG. 5. Also shown in FIG. 6 is longitudinal fluid passage 404 and radial fluid passage 405 between the longitudinal fluid passage 404 and the receiving chamber 403. Plug 406 at one end of the longitudinal fluid passage also is shown.

In the embodiment of FIG. 6, a seal retaining member 410 is positioned between the poppet valve actuator 402 and the central bore of the female member. As in the embodiment of FIG. 5, the seal retaining member 410 may be threaded to the wall 431 in the central bore with threads 411 or otherwise secured to the central bore of the female member.

In the embodiment shown in FIG. 6, a pair of seals 413 and 415 are positioned on shoulder 417 in the female member receiving chamber 403. Seal retainer 412 has a first end 435, a second end 436, an inner surface 437 and an outer surface 438. Seal retainer 412 is inserted into the receiving chamber 403 and is provided with a seal groove 414 for seal 413, and a seal groove 416 for seal 415. These grooves are at the second end 436 of the retainer. Seals 413 and 415 are preferably radial metal seals but may be elastomeric seals. Seal 413 sealingly engages the inner circumference 437 of the retainer 412 and cylindrical probe wall 203 of the male member when the male member is inserted into the receiving chamber 403. The seal 415 engages the outer circumference 438 of the retainer 412 and the wall 432 of the receiving chamber.

The retainer 412 has a radial fluid port (or passage) 418 which aligns with the radial fluid passage 405 in the female member when the retainer 412 is inserted into the receiving chamber adjacent shoulder 417.

The first set of seals 413 and 415 are at the inboard side of the receiving chamber adjacent the radial passage 418. A second set of seals 419 and 421 are at the outboard end of the receiving chamber adjacent the fluid passage 418. Seals 419 and 421 are preferably pressure energized radial metal seals, but may be other types of seals, as discussed above. Seal 419 is positioned in seal groove 420 and seals with the inner circumference 437 of the first end 435 of seal retainer 412 and the cylindrical probe wall 203 of the male member. Seal 421 is positioned in seal groove 422 and seals between the outer circumference 438 of the first end 435 of seal retainer 412 and the wall 432 of the receiving chamber 403.

In the second preferred embodiment, a retainer locking member 423 is next inserted into the receiving chamber 403. The retainer locking member 423 includes threads 428 at its outer circumference to threadably engage the receiving chamber wall 432. The retainer locking member 423 secures the seal retainer 412 in the central bore. The retainer locking member 423 may be threaded or otherwise secured to the outside surface of the female member, or may be replaced with a retainer clip.

A seal 424 is positioned at the outer circumference of retainer locking member 423, and the seal 424 is positioned in groove 425. Also shown in FIG. 6 is a seal 426 positioned in groove 427 in the inner circumference of the retainer locking member. These seals are preferably elastomeric seals or O-rings.

To axially position the retainer locking member 423 in the receiving chamber, the receiving chamber includes shoulder 429 and the retainer locking member has a mating shoulder 430.

Also shown in FIG. 6 is seal 407, in the receiving chamber 403, to form a seal between the receiving chamber wall 433 and the outer cylindrical surface 203 of the male member.

The male member as described above in FIG. 4 may be used with the female member 400 shown in FIG. 6 without modification. When the male member 200 is inserted into the receiving chamber 403 of the female member, the male member extends through the retainer locking member 423, seals 419 and 413, and seal retainer 412. The inner edges of the seals 413 and 419 engage the circumference of the male member in a sealing relationship and this is accomplished prior to the mutual engagement of the valve actuators 402 and 210. Therefore, the seals 413 and 419 provide a fluid seal between the male member and the seal retainer 412 prior to the communication of fluid between the members. Also, the seals 415 and 421 provide a fluid seal between the seal retainer 412 and the receiving chamber wall 432 prior to communication of fluid between the members.

When a coupling utilizing the female member shown in FIG. 6 is assembled and pressurized, fluid communication is established between the male and female members through the radial passageways 405 in the female member, the fluid passage 418 in the retainer, and the radial fluid passage 204 in the male member. When that fluid path is established, fluid pressure is transmitted to the cavities in seals 413, 415, 419 and 421. The seals therefore are pressurized. The fluid pressure in the cavities will urge the inner edges and the outer edges of the seals to move radially, thereby urging the seals to expand radially to increase their outside diameters and decrease their inside diameters. The sealing effect will be enhanced by the presence of fluid pressure in the coupling.

Similarly, when a coupling utilizing the female member shown in FIG. 5 is assembled and pressurized, fluid communication is established between the male and female members through radial passageways 310 in the female member, fluid passage 338 in the seal retainer, and radial fluid passage 204 in the male member. This fluid path transmits fluid pressure to cavities in seals 333, 335, 340 and 342, to enhance the sealing effect.

Although variations in the embodiment of the present invention may not each realize all of the advantages of the invention, certain features may become more important than others in various applications of the device. The invention, accordingly, should be understood to be limited only by the scope of the appended claims.

I claim:

1. A coupling comprising:
   (a) a female member having a longitudinal axis, a central bore extending along the longitudinal axis from a first end to a second end thereof, a first longitudinal fluid passage generally parallel to the central bore, first and second radial fluid passages extending from the first longitudinal fluid passage to the central bore for fluid communication therebetween, and a first shoulder in the central bore intermediate the first and second radial fluid passages;
   (b) a first seal retainer insertable into the central bore and positionable adjacent the first shoulder, the first seal retainer having a first end, a second end, an inner surface, an outer surface, and a radially-directed port between the inner surface and the outer surface for fluid communication with the second radial fluid passage;
   (c) a first retainer-locking member engagable with the female member for locking the first seal retainer in the central bore adjacent the first shoulder;
   (d) a male member for insertion into the central bore and extending through the first retainer-locking member and the first seal retainer, the male member having an outer surface, a central bore, and a third radial fluid passage extending between the central bore of the male member and the outer surface of the male member, the third radial fluid passage positionable to provide fluid communication with the radially directed port of the first seal retainer and the second radial fluid passage of the female member when the male member is inserted into the first central bore of the female member;
   (e) a first ring-shaped seal positionable between the first shoulder and the outer surface of the first end of the first seal retainer for sealing radially with the first seal retainer and the central bore;
   (f) a second ring-shaped seal positionable between the first shoulder and the inner surface of the first end of the first seal retainer for sealing radially with the first seal retainer and the outer surface of the male member;
   (g) a third ring-shaped seal positionable between the first retainer-locking member and the outer surface of the second end of the first seal retainer for sealing radially with the first seal retainer and the central bore; and
   (h) a fourth ring-shaped seal positionable between the first retainer-locking member and the inner surface of the second end of the first seal retainer for sealing radially with the first seal retainer and the outer surface of the male member.

2. The coupling of claim 1, wherein the first, second, third and fourth ring-shaped seals comprise metal seals having cavities in communication with fluid in the coupling, each of the ringshaped seals responsive to fluid pressure in the cavities to be urged to expand radially.

3. The coupling of claim wherein the first retainer-locking member is threadable to the female member.

4. The coupling of claim 3, wherein the first retainer-locking member has an inner circumferential surface and a threaded outer circumferential surface, and the central bore of the female member has a threaded inner circumferential surface.

5. The coupling of claim 1, further comprising a first groove at the outer surface of the first seal retainer, and a second groove at the inner surface of the first seal retainer, and wherein the first and second ring-shaped seals are positionable in the first and second grooves respectively.

6. The coupling of claim further comprising a third groove at the outer surface of the first seal retainer, and a fourth groove at the inner surface of the first seal retainer, and wherein the third and fourth ring-shaped seals are positionable in the third and fourth grooves respectively.

7. The coupling of claim 1, wherein the first retainer-locking member comprises an outer surface, an inner surface, a groove in the inner surface, and a fifth ring-shaped seal positionable in the groove for radially sealing between the first retainer-locking member and the outer surface of the male member.

8. The coupling of claim wherein the first retainer-locking member comprises an outer surface, an inner surface, a groove in the outer surface, and a fifth ring-shaped seal positionable in the groove for radially sealing with the first retainer-locking member and the central bore of the female member.

9. The coupling of claim 1, further comprising a groove in the central bore of the female member, and a fifth ring-shaped seal positionable therein for radially sealing with the central bore of the female member and the outer surface of the male member.

10. The coupling of claim 1, further comprising a fifth ringshaped seal positionable between the outer surface of the first seal retainer and the central bore of the female member.

11. The coupling of claim 1, further comprising a vent passage extending between the central bore of the female member and the outside surface of the female member.

12. The coupling of claim 11, further comprising means for sealing the vent passage from fluid flow into the receiving chamber.

13. The coupling of claim 1, further comprising a check valve and a valve seat in the central bore of the female member for controlling fluid communication between the central bore of the female member and the first radial fluid passage, the check valve biased to a normally closed position against the valve seat.

14. The coupling of claim 13, further comprising a valve actuator slidable in the central bore of the female member to urge the check valve into the open position.

15. The coupling of claim 14, further comprising a fifth ring-shaped seal positionable between and sealingly engageable with the valve actuator and the central bore of the female member.

16. The coupling of claim 14, further comprising:
(a) a second shoulder in the central bore of the female member intermediate the first radial fluid passage and the first shoulder; and
(b) a flange on the valve actuator, the flange abutting the second shoulder when the check valve is in the normally closed position against the valve seat.

17. The coupling of claim 14, further comprising:
(a) a second shoulder in the central bore of the female member intermediate the first radial fluid passage and the first shoulder;
(b) a fifth ring-shaped seal positionable on the second shoulder for sealing radially with the central bore of the female member and the valve actuator; and
(c) a second seal retainer insertable into the central bore of the female member for retaining the fifth ring-shaped seal on the second shoulder.

18. The coupling of claim 17, wherein the fifth ring-shaped seal comprises a metal seal having a cavity in communication with fluid in the coupling, the fifth ring-shaped seal responsive to fluid pressure in the cavity to be urged to expand radially.

19. The coupling of claim 17, wherein the fifth ring-shaped seal has a dovetail interfit with the second seal retainer.

20. The coupling of claim 17, further comprising a sixth ring-shaped seal positionable between the second seal retainer and the central bore of the female member.

21. The coupling of claim 17, further comprising a sixth ring-shaped seal having a dovetail interfit with the second seal retainer and sealing radially with the second seal retainer and the valve actuator.

22. The coupling of claim 17, further comprising a second retainer-locking member engageable with the female member for locking the second seal retainer in the central bore of the female member.

23. The coupling of claim 22, wherein the second retainer-locking member is threadable to the female member.

24. The coupling of claim 1, further comprising a check valve and a valve seat in the central bore of the male member for controlling fluid communication between the central bore of the male member and the third radial fluid passage, the check valve biased to a normally closed position against the valve seat.

25. The coupling of claim 24, further comprising a valve actuator slidable in the central bore of the male member to urge the check valve into the open position.

26. The coupling of claim 25, further comprising a fifth ring-shaped seal positionable between and sealingly engageable with the valve actuator and the central bore of the male member.

27. The coupling of claim 25, further comprising:
(a) a second shoulder in the central bore of the male member intermediate the third radial passage and the probe face; and
(b) a flange on the valve actuator, the flange abutting the second shoulder when the check valve is in the normally closed position against the valve seat.

28. The coupling of claim 25, further comprising:
(a) a second shoulder in the central bore of the male member intermediate the third radial passage and the probe face;
(b) a fifth ring-shaped seal positionable on the second shoulder for sealing radially with the central bore of the male member and the valve actuator; and
(c) a second seal retainer insertable into the central bore of the male member for retaining the fifth ring-shaped seal on the second shoulder.

29. The coupling of claim 28, wherein the fifth ring-shaped seal comprises a metal seal having a cavity in communication with fluid in the coupling, the fifth ring-shaped seal responsive to fluid pressure in the cavity to be urged to expand radially.

30. The coupling of claim 28, wherein the fifth ring-shaped seal has a dovetail interfit with the second seal retainer.

31. The coupling of claim 28, further comprising a sixth ring-shaped sea positionable between the second seal retainer and the central bore of the male member.

32. The coupling of claim 28, further comprising a sixth ring-shaped seal having a dovetail interfit with the second seal retainer and sealing radially with the second seal retainer and the valve actuator.

33. The coupling of claim 28, further comprising a second retainer-locking member engageable with the male member for locking the second seal retainer in the central bore of the male member.

34. The coupling of claim 33, wherein the second retainer-locking member is threadable to the male member.

35. The coupling of claim 1, further comprising a fifth ring-shaped seal having a dovetail interfit between the second end of the first seal retainer and the first shoulder.

36. The coupling of claim 1, wherein the first seal retainer comprises:
  (a) a first retaining member having a first end and a second end, and being insertable into the central bore such that the second end is positioned adjacent the first shoulder; and
  (b) a second retaining member having a first end and a second end and being insertable into the central bore such that the second end is positioned adjacent the first retaining member.

37. The coupling of claim 36, wherein the first and second ring-shaped seals are positionable between the first end of the first retaining member and the second end of the second retaining member.

38. The coupling of claim 36 wherein the third and fourth ring shaped seals are positionable between the first end of the first retaining member and the second end of the second retaining member.

39. The coupling of claim 36, further comprising a fifth ring-shaped seal having a dovetail interfit between the first end of the first retaining member and the second end of the second retaining member.

40. The coupling of claim 36, further comprising a fifth ring-shaped seal having a dovetail interfit between the first end of the second retaining member and the first retainer-locking member.

41. The coupling of claim 36, wherein the radially directed port is in the first retaining member.

42. The coupling of claim 36, wherein radially directed port is in the second retaining member.

43. A coupling comprising:
  (a) a male member having a leading face, a central bore, a fluid passage extending radially from the central bore to an outer lateral surface of the male member, and first valve means to control fluid flow between the central bore and the fluid passage;
  (b) a female member having a receiving chamber for receiving the male member, a central bore, a fluid passage having a first section extending radially from the central bore, a second section extending radially from the receiving chamber, and a longitudinal section interconnecting the first and second radial sections, the female member including second valve means to control fluid flow between the central bore and the fluid passage in the female member;
  (c) first seal retaining means insertable into the receiving chamber, the seal retaining means having a port through which fluid is communicated between the fluid passages in the male and the female members;
  (d) a first pair of radial metal seals located in the receiving chamber, one seal on each side of the fluid passages, for sealing engagement with the receiving chamber and with the first seal retaining means; and
  (e) a second pair of radial metal seals located in the receiving chamber, one seal on each side of the fluid passages, for sealing engagement with the first seal retaining means and with the outer lateral surface of the male member.

44. The coupling of claim 43 further comprising first retainer locking means engageable with the female member for locking the first seal retaining means in the receiving chamber.

45. The coupling of claim 43 further comprising a first ringshaped dovetail seal having a dovetail interfit with the first seal retaining means.

46. The coupling of claim 43 further comprising a vent passage extending between the receiving chamber and the outside surface of the female member, and means for sealing the vent passage from fluid flow into the receiving chamber of the female member.

47. The coupling of claim 43 wherein at least one of the first and second valve means comprises:
  (a) a valve seat intermediate the central bore;
  (b) a poppet valve biased to a normally closed position against the valve seat; and
  (c) a poppet valve actuator slidable in the central bore and adapted to urge the poppet valve away from the valve seat to open the valve means.

48. The coupling of claim 47 wherein at least one of the first and second valve means comprises:
  (a) a third radial metal seal for sealing engagement with the poppet valve actuator and with the central bore; and
  (b) second seal retaining means insertable into the central bore for retaining the third metal seal in the central bore.

49. The coupling of claim 48 wherein at least one of the first and second valve means comprises a second ring-shaped dovetail seal having a dovetail interfit with the second seal retaining means.

50. A coupling comprising:
  (a) a female member having a central bore along a longitudinal axis from a first end to a second end thereof, a check valve intermediate the central bore, a first radial fluid passage intermediate the check valve and the first end, and a valve actuator to open the check valve for fluid communication between the central bore and the first radial fluid passage;
  (b) a male member having a central bore along a longitudinal axis from a first end to a second end thereof, a check valve intermediate the central bore, a second radial fluid passage intermediate the check valve and the first end, and a valve actuator to open the check valve for fluid communication between the central bore and the second radial fluid passage; and
  (c) a seal member engageable with the female member and having a third radial fluid passage extending therethrough, a first pair of ring-shaped seals with one seal on each side of the third radial fluid passage and sealing between the seal member and the female member, and a second pair of ring-shaped seals with one seal on each side of the third radial fluid passage and sealing between the seal member and the male member, the male member insertable through the seal member for fluid communication through the first, second and third radial passages.

* * * * *

UNITED STATES PATENT AND TRADEMARK OFFICE
CERTIFICATE OF CORRECTION

PATENT NO. : 5,099,882
DATED : 3/31/92
INVENTOR(S) : Robert E. Smith, III

It is certified that error appears in the above-identified patent and that said Letters Patent is hereby corrected as shown below:

In claim 3, at column 14, line 50, after the word "claim", a number "1" should be inserted.

In claim 6, at column 14, line 63, after the word "claim", a number "1" should be inserted.

Signed and Sealed this

Thirty-first Day of August, 1993

*Attest:*

BRUCE LEHMAN

*Attesting Officer*   *Commissioner of Patents and Trademarks*